United States Patent [19]
Hershey

[11] Patent Number: 5,481,535
[45] Date of Patent: Jan. 2, 1996

[54] DATAGRAM MESSAGE COMMUNICATION SERVICE EMPLOYING A HYBRID NETWORK

[75] Inventor: John E. Hershey, Ballston Lake, N.Y.

[73] Assignee: General Electric Company, Schenectady, N.Y.

[21] Appl. No.: 267,348

[22] Filed: Jun. 29, 1994

[51] Int. Cl.⁶ ..................................................... H04L 12/56
[52] U.S. Cl. ........................ 370/60; 370/85.13; 370/94.1; 379/60; 455/33.1; 455/54.2; 455/56.1; 371/33
[58] Field of Search ............................... 370/60, 93, 94.1, 370/85.13, 85.2, 85.3, 85.7, 94.3, 95.1, 95.3; 379/58–60, 63; 455/33.1, 49.1, 54.1, 56.1, 54.2; 371/32, 33

[56] References Cited

U.S. PATENT DOCUMENTS

| 5,159,592 | 10/1992 | Perkins | 370/85.13 X |
| 5,168,498 | 12/1992 | Adams et al. | 370/95.1 |
| 5,274,841 | 12/1993 | Natarajan et al. | 455/33.4 |
| 5,295,154 | 3/1994 | Meier et al. | 375/1 |
| 5,319,699 | 6/1994 | Kerihuel et al. | 379/58 |
| 5,339,316 | 8/1994 | Diepstraten | 370/85.13 |

OTHER PUBLICATIONS

U.S. patent application "Datagram Communication Service Over a Cellular Telephone Network", inventors J. E. Hershey, A. A. Hassan (GE Atty. Docket No. RD∝23752) 08/267,328.

U.S. patent application RD–23753, inventors J. E. Hershey, G. J. Saulnier, (GE Atty. Docket No. RD–23753) 08/267, 346; "Parallel Dataword Modulation Scheme".

Primary Examiner—Douglas W. Olms
Assistant Examiner—Russell W. Blum
Attorney, Agent, or Firm—Lawrence P. Zale; Marvin Snyder

[57] ABSTRACT

A highly fault tolerant system for datagram communication of information in the form of a message packet employs a distributed network of transmitter/receivers 'transceivers', which interact with 'bridge transceivers' which are transceivers connected to a wired network, and wired nodes each having a unique identification ("ID") number. An initiating unit, which may be a transceiver, bridge transceiver or wired node, creates a message packet having an ID of an intended destination unit. If initiated from a transceiver, the message packet finds its way to a wired network by broadcasting the message packet to local transceivers. The transceivers determine valid message packets which have not expired, not been received before and were transmitted without errors. If the message packet is valid and the transceiver ID does not match its internal ID, the transceiver broadcasts the valid message packet to other local transceivers. The transceivers which receive the message packet repeat the process. The message then finds its way to a bridge transceiver connected to a wired network. A 'NODE LOC' is embedded in the message packet identifying a closest wired node. The message is routed through the wired network to the wired node and then transmitted as described above to a destination unit by radio signals.

4 Claims, 7 Drawing Sheets mt = mobile transceiver;  bt = bridge transceiver

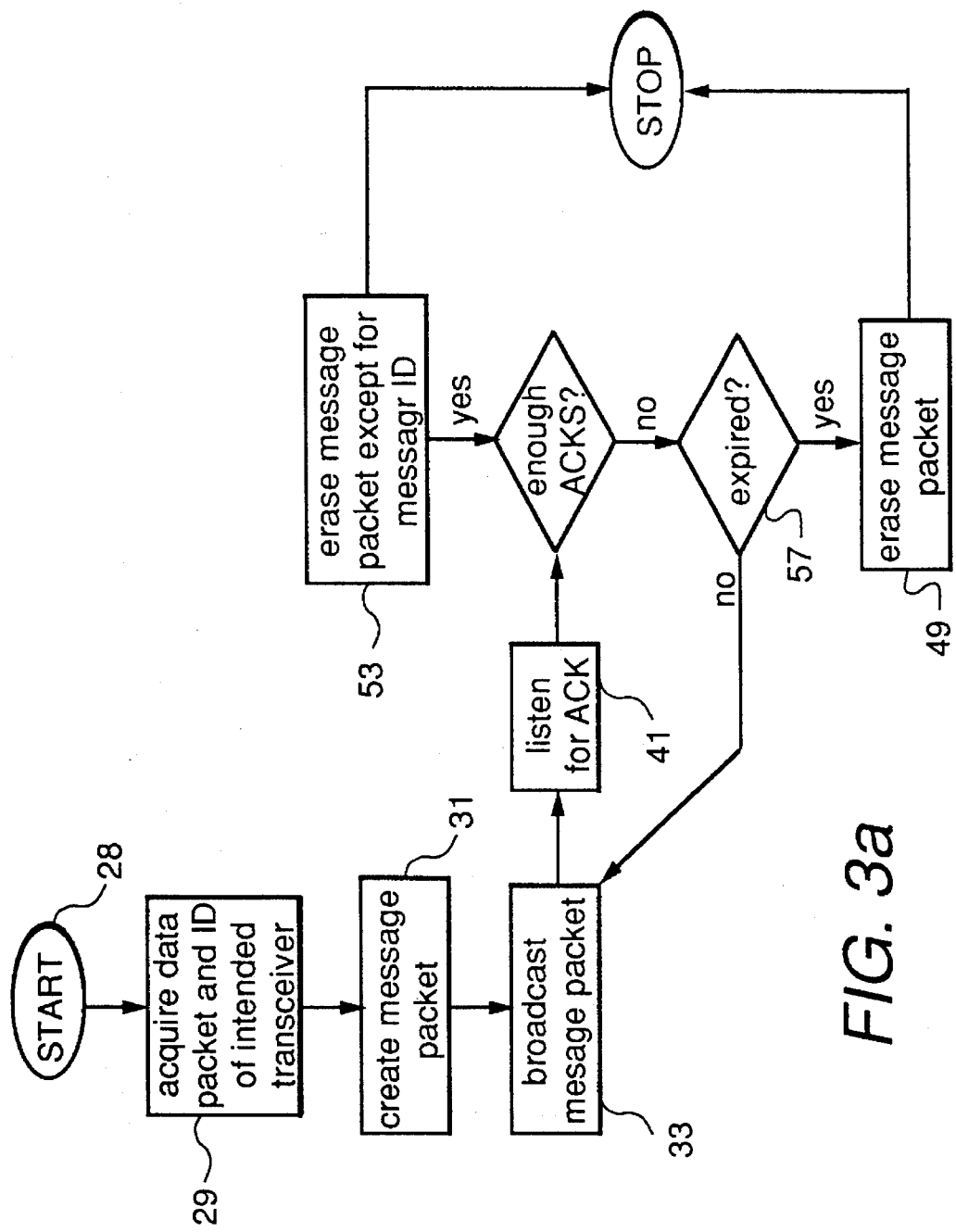

DATAGRAM MESSAGE COMMUNICATION SERVICE EMPLOYING A HYBRID NETWORK

CROSS REFERENCE TO RELATED APPLICATIONS

This invention is related to U.S. patent applications Ser. No. 08/267,347, pending, "New Mobile Telecommunications Device and Service" by Amer Hassan, John Hershey, Howard Lester, Charles Puckette; Ser. No. 08/267,328, pending, "Datagram Communication Service over a Cellular Telephone Network" by John Hershey, Amer Hassan; and Ser. No. 08/267,346, pending, "Parallel Dataword Modulation Scheme" by John Hershey, Gary Saulnier all filed Jun. 29, 1994 assigned to the present assignee and hereby incorporated by reference.

BACKGROUND OF THE INVENTION

1. Field of the Invention

The present invention relates to the field of digital message transmission and more specifically transmitting data over a hybrid, radio/wired network.

2. Description of Related Art

Wired networks, such as the 'internet', telephone or cable television networks are well adapted for transmitting messages long distances quickly, but the intended recipient must be connected to the wired network.

Radio pager, or repeater systems, provide mobility to a recipient, but have problems transmitting great distances. Radio transmission also tends to be a problem in areas, such as cities, having high rise buildings. The buildings tend to block radio transmissions and cause 'shadowing'. A transmitter/receiver, 'transceiver', communicating with radiowave signals has to contend with these shadowing effects. This problem tends to be worse when at least one of the transceivers is a mobile unit. As the mobile unit moves into an area which experiences shadowing, the received signal is attenuated, has multi-path interference and may reduce the signal quality to a degree that the message may not be received at all.

One method of combating shadowing is to position repeaters having antennae dispersed around an area in which radio communication is desired. Antenna rental space has become increasingly more costly causing this method to become increasingly unattractive.

Cellular telephone systems provide both mobility to the intended recipient, and can transmit great distances, provided that there is a cellular base station nearby. Message transmission by cellular telephones, however, tends to be costly. Most of the cost is due to providing continuous and real-time communication. Large volumes of packet data, such as "datagrams", do not need to be received in real-time, and do not have to be continuously received, thereby making transmission by cellular telephone 'overkill'.

Message transmission, in general, becomes very costly, slow and complex when the system is driven by a 'master' controller which organizes the transceivers under its control. The control communication, between the 'master' and its transceivers, not part of messages to be delivered, or 'overhead', adds to the communication traffic. The transceivers also wait idle until there it is their rum to send or receive messages. As more transceivers are added, and/or the message traffic increases, the 'master' becomes overloaded and becomes the limiting factor in message transmission.

Currently there is a need for a simple and inexpensive method of 'datagram' transmission which provides mobility to a recipient, which has the long-distance ability and speed of a wired network.

SUMMARY OF THE INVENTION

Datagrams are transmitted over a hybrid radio/wired network having a a number of communicating units being radio transceivers, wired nodes, and bridge transceivers which connect to both the wired network and communicate with the transceivers. Each communicating unit has a unique ID number.

An operator at an initiating unit, being either a transceiver, bridge transceiver or wired node, provides message information.

The initiating unit determines a destination identification number (ID) for a destination unit desired to receive the message, a 'NODE LOC' code identifying a wired node closest to the intended destination unit, and a message ID. A message packet is constructed from the destination ID, the 'NODE LOC', the message information and synchronization words.

The message packet is provided to a bridge transceiver connected to the wired network.

The bridge transceiver looks up the 'NODE LOC' and routes the message packet to the node identified by 'NODE LOC' through the wired network. The wired node at 'NODE LOC' checks the destination ID with its own ID and if the IDs match, the message has been successfully transmitted to its intended destination; if the IDs do not match, the bridge transceiver broadcasts the message packet by radio signal to local transceivers.

Each transceiver receiving the broadcast checks for errors in the received message packet, and sends an acknowledgement signal if received with no errors.

The message is identified as a valid message packet if it was received without errors, has not expired and is has an message ID which does not match stored message IDs.

The destination ID is compared to the ID of the recipient transceiver.

If the destination ID matches the internal ID of the recipient transceiver, the message packet has been successfully transmitted to its intended destination and the message packet is stored an utilized.

If the destination ID does not match the internal ID of the recipient transceiver, valid message packets are re-broadcast to other recipient transceivers, and the process continues until it reaches the intended destination, or expires.

OBJECTS OF THE INVENTION

It is an object of the present invention to provide a message transmission system which relays radio transmissions great distances.

Another object of the present invention is to provide a simple, highly fault tolerant method of relaying information to a desired unit in a hybrid radio/wired network.

It is another object of the present invention to provide a simple method of employing radio transmission to transmit information in a mobile radio system to a receiver unencumbered by the effects of 'shadowing'.

BRIEF DESCRIPTION OF THE DRAWINGS

The features believed to be novel are set forth with particularity in the appended claims. The invention itself, however, both as to organization and method of operation together with the further objects and advantages thereof may best be understood by reference to the following description in conjunction with the as accompanying drawings in which:

FIG. 3a is a simplified flow chart illustrating a method of initiating a message packet from a transceiver according to the present invention.

DETAILED DESCRIPTION OF THE INVENTION

The present invention is a low cost data message packet transportation service ideally suited for a large metropolitan area in which point to point communications are either impossible or costly. The present invention delivers message packets in a 'DATAGRAM' mode in that a packet is initiated and relayed with best effort for delivery with no guarantee, except at a possible higher level of the user protocol. The packets are relayed through a network of available mobile or fixed transceivers, bridge transceivers and wired nodes. The delivery time of a packet is expected to be highly variable. The service is not expected to meet the needs of real time communications such as voice but rather to address the needs of large volume data transport.

Figure 1A:
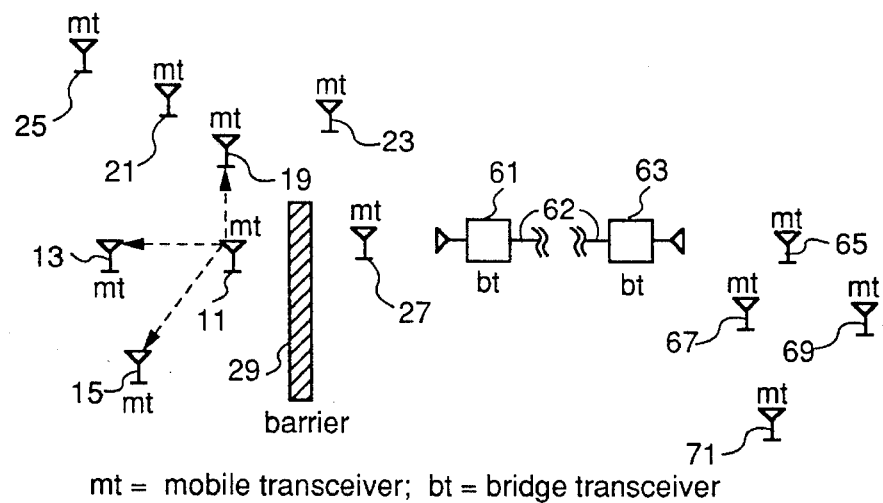
FIGS. 1a, 1b, 1c, 1d, 1e, 1f, 1g and 1h together illustrate a method of message communication according to the present invention.

In FIG. 1a, the elements of a hybrid radio/wired network datagram communication system are shown. Radio transmitter/receivers, 'transceivers', receive and transmit information by radio waves. These transceivers may be located on the mobile vehicle or positioned at a fixed 'base station'. Bridge transceivers 61 and 63 have the capability of transmitting and receiving radio communications and also for passing and receiving messages through a wired network 62. The wired network may be a computer network such as 'the internet', a telephone network or a cable TV network. Bridge transceivers 61 and 63 have enough 'smarts' to determine the connections and routing to pass the message through the wired network to a desired wired node. A wired node is any element connected to the wired network capable of sending and receiving messages. Bridge transceivers 61 and 63 may also be considered a wired node.

Wired network 62 may be a large wired network such that bridge transceiver 61 is located a great distance from bridge transceiver 63. Transceivers 65, 67, 69 and 71 would be located proximate, in a local radio transmission region adjacent to, bridge transceiver 63. It is envisioned that bridge transceiver 61 be located in or near a first urban area as are transceivers 11–27 and bridge transceiver 63 located in or near a second urban area a great distance away along with transceivers 65–71. Messages intended for an intended urban area are routed to the bridge transceiver(s) servicing that urban area.

In FIG. 1a, a datagram is initiated at transceiver 11 which is intended to be sent to a second urban area to transceiver 71. The transceivers, bridge transceivers and wired nodes may each be referred to as 'communicating units' or simply 'units'. In the example provided, the initiating unit is a transceiver and the destination unit is also a transceiver. It is envisioned that in the present as invention that the initiating unit may be either a transceiver, bridge unit or wired node, with the destination unit being a transceiver, bridge transceiver or wired node. Also for the sake of illustration, a radio barrier 29 which may be a mountain or building, is interposed between initiating transceiver 11 and bridge transceiver 61. The purpose of adding radio barrier 29 is to illustrate that besides being an efficient, fault-tolerant system for transmitting datagrams, the present invention also has the ability to pass message around radio barriers both before entering the wired network and after exiting the wired network.

Figure 2:
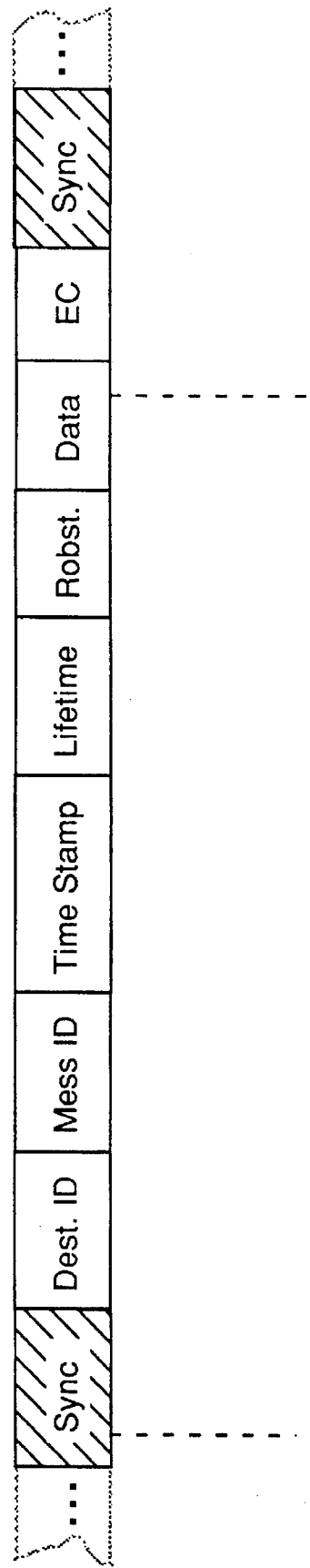
FIG. 2 is a proposed message packet structure compatible with the present invention.

Information desired to be transmitted may be data or digitized analog information. This information is stored as a message packet. The message packet fields compatible with the present invention are shown in FIG. 2. The fields are:

SYNCH: This is a unique word or "flag". As is common in bit-oriented protocols, it serves to both mark The beginning and termination of a message packet.

DESTINATION ID: The unique identification number of the transceiver intended to ultimately receive the message packet.

NODE LOC: A code identifying a wired node location closest to the intended recipient.

MESSAGE ID: This is the packet's identification number. It includes both the packet's originator's address and a packet number assigned by the packet originator.

TIME STAMP: This specifies the time the packet was launched into the network.

LIFETIME: The lifetime beyond which the packet will not be useful.

ROBUSTNESS: This integer specifies the minimum number of different receivers who must accept the packet.

DATA: The data or message to be conveyed by the packet.

EC: The error check—most likely an error detecting word/cyclic redundancy check (CRC).

Transceiver 11 broadcasts its message, as a message packet to transceivers 13, 15 and 19 which are within its range and are unobstructed by barrier 29. Transceiver 17 did not receive the signal from transceiver 11 due to barrier 29. Transceivers 13, 15 and 19 check the 'EC' field of the message packet to determine errors. If no errors are detected, they send an acknowledge signal ("ACK") indicating that the message has been received with no errors, to transceiver 11. Transceiver 11 keeps track of the number of transceivers which have successfully received the message and then that meets or exceeds the number in the 'ROBUSTNESS' field, the message packet is discarded except for the 'MESSAGE ID' which is held in a rotating buffer replacing the oldest message ID when the buffer is full.

Transceivers 13, 15 and 19 compare the transmitted ID number with their own internal, or stored, ID number. If the IDs match, the message has been successfully transmitted to its intended transceiver.

If the ID number of the message packet does not match their own ID, they next determine if they have received this message The value in the 'LIFETIME' field is added to the value in the 'TIME STAMP' field and compared to the current time to determine if the message expired. If it has, the message is ignored; if not, transceivers 13, 15 and 19 forward the message to other transceivers in their range until they have transmitted to the number of transceivers indicated in 'ROBUSTNESS' field, or the message has expired.

It is not critical in determining if the message packet is valid by changing the order in which it is determined if the message packet has been received before, if it has expired and if there was a transmission error, but that simply these be determined.

Figure 1B:
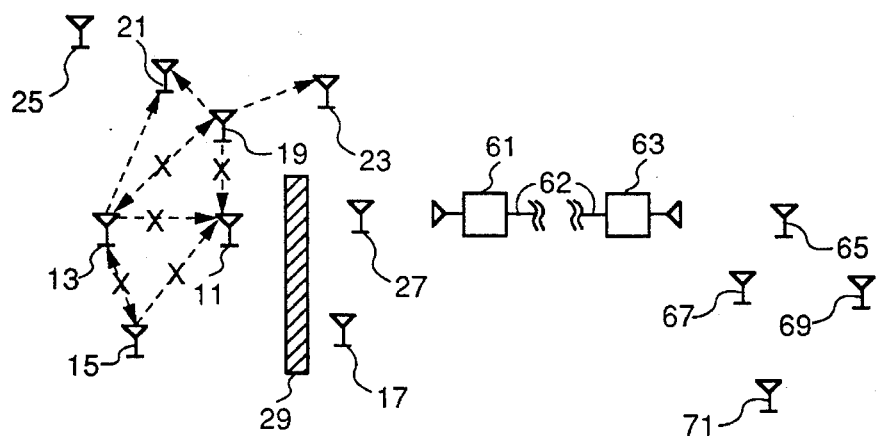

In FIG. 1*b*, transceiver 13 broadcasts to transceivers 11, 15 and 21; transceiver 15 broadcasts to transceivers 11 and 13; and similarly, transceiver 19 broadcasts the message to transceivers 11, 21 and 23.

Figure 3B:
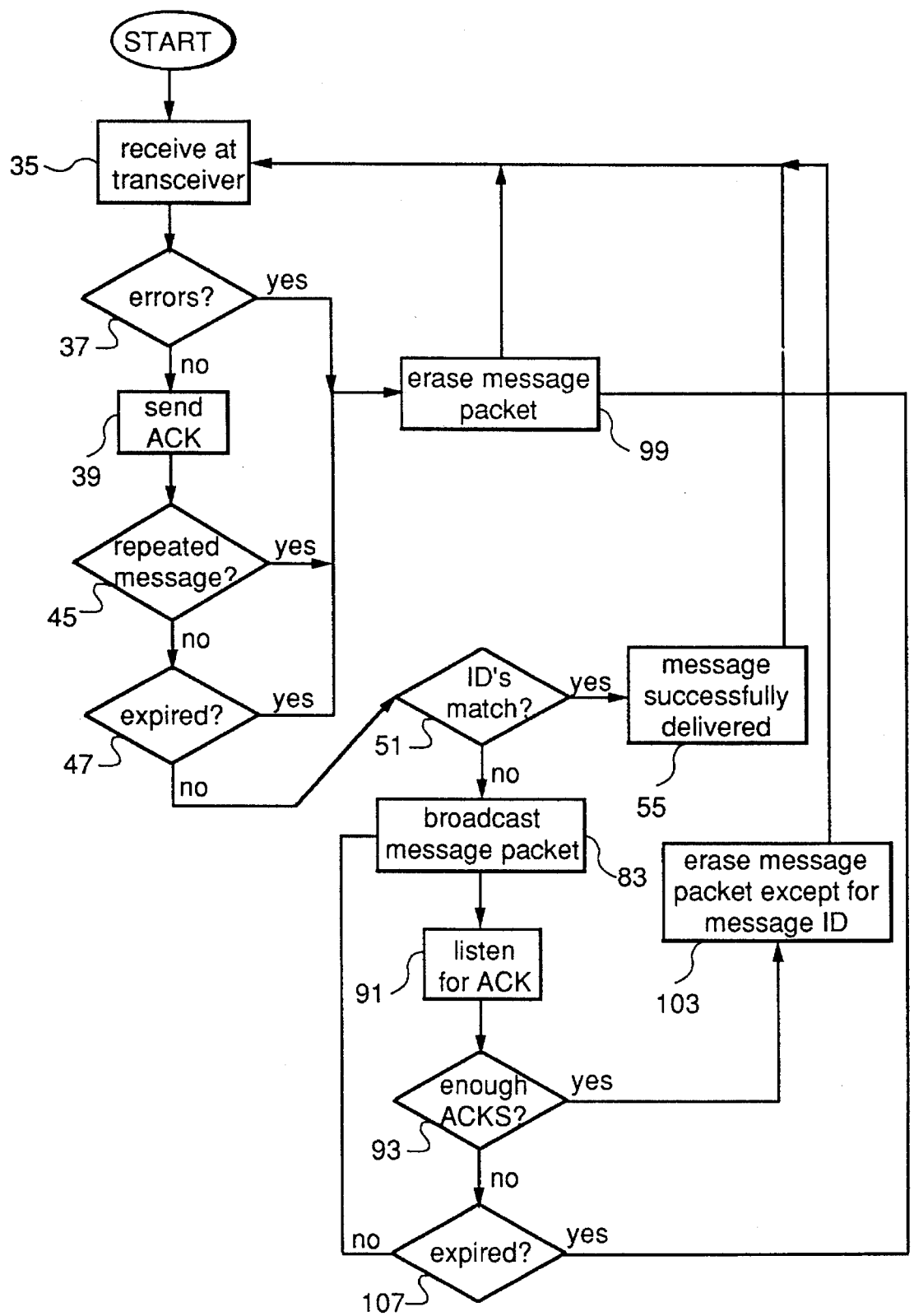
FIG. 3b is a simplified flow chart illustrating a method of transceivers receiving and re-transmitting a message packet according to the present invention.

After the broadcasts illustrated in FIG. 1*b*, all receiving transceiver check the 'EC' field 4, send an acknowledgement if no errors are detected, as before. They determine if the message has expired and discard it if so. If the message packet has no errors, has not expired, they then determine if they have seen this message before, indicating if the message packet is valid. If it is valid, they review the ID of the message packet and determine if that is their ID. If it is not their ID, they then broadcast the message packet to transceiver 11, 13 and 15 and 19 which are ignored, as represented in FIG. 3*b*. All ignored messages in the Figures are denoted by an "x".

Figure 1C:
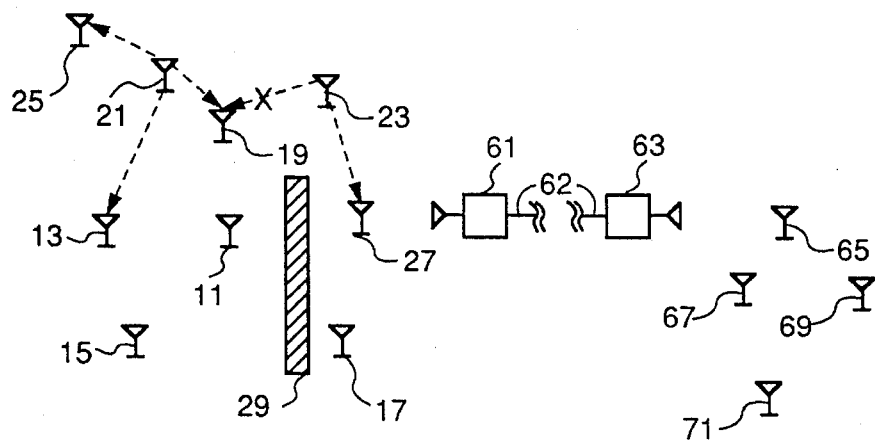

In FIG. 1*c*, transceivers 21 and 23 broadcast the message. Transceiver 21 broadcasts to transceivers 13, 19 and 25. The message received by transceiver 13 and 19 is ignored since they have seen the message before. Transceiver 23 broadcasts the message packet to transceivers 19 and 27. The message has been successfully transmitted around barrier 29 to reach transceiver 27.

Figure 1D:
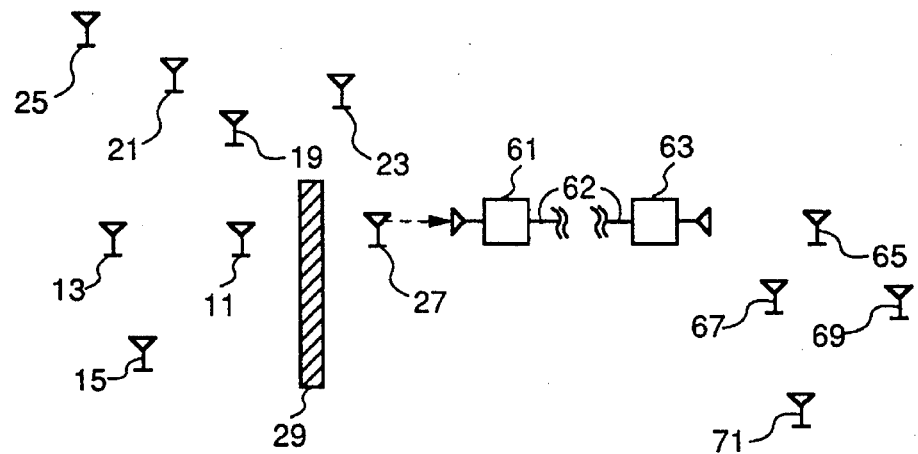
Figure 1E:
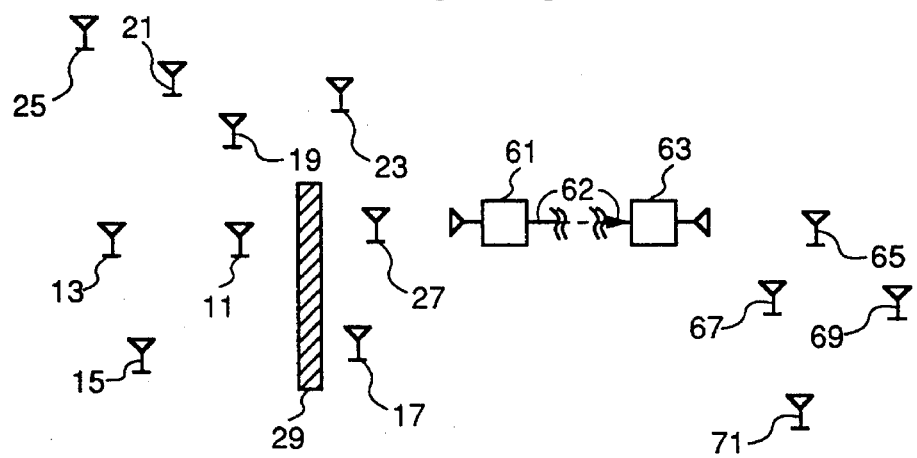

In FIG. 1*d*, transceiver 27 determines the messages valid in transmits it on to bridge transceiver 61. Bridge transceiver 61 reviews the 'NODE LOC' field of the message packet to determine its location over the wired network 62. In FIG. 1*e*, the message is transferred from bridge transceiver 61 through wired network 62 to bridge transceiver 63 at a remote location in a second urban area where the intended transceiver 71 is assumed to be.

Figure 1F:
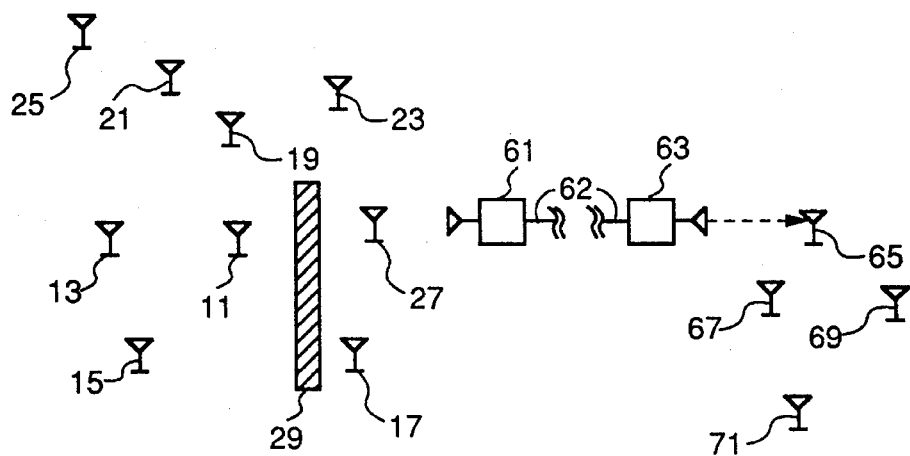
Figure 1G:
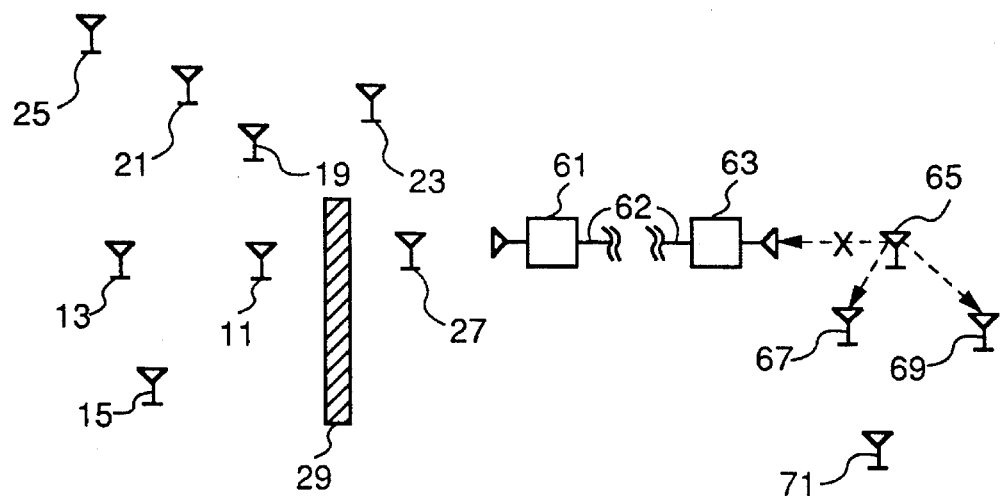
Figure 1H:
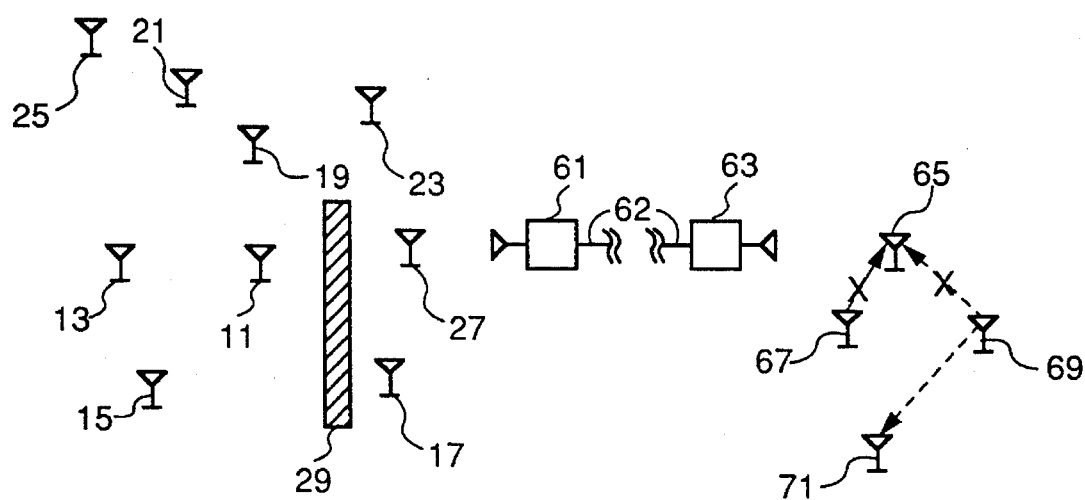

In FIG. 1*f*, bridge transceiver 63 transmits via radio waves to local transceivers which is received by transceiver 65. As described before, transceiver 65 examines the message packet, determines that it is not intended for itself and passes the message along to transceivers 67 and 69 in FIG. 1*g*. In FIG. 1*h*, transceiver 69 forwards the message packet to transceiver 71. Transceiver 71 recognizes that the message is intended for itself and retains and utilizes the message packet.

In FIGS. 1*a* through 1*h*, the message spreads from its original transceiver 11 outward. The inward signal, the signal moving back towards the original transceiver, is ignored. In this fashion, message packets may swiftly be communicated without the need of complicated control signals and reach a destination around barriers.

In another embodiment, the mobile and fixed units continuously emit a very low power identification signal. When a mobile unit comes into the proximity of a fixed unit, the units mutually discover each other's presence and establish a wideband low protocol, a short time, high volume exchange of packetized data.

FIG. 3*a* illustrates a simplified flow diagram showing steps of initiating a message packet from a transceiver according to the present invention. The process begins at block 28. In block 29, information desired to be transmitted is acquired from a data source. The ID of the transceiver which this information is desired to be transmitted is also acquired by means of a look-up table, or other database. In block 31, a message packet is created according to FIG. 2. The initiating transceiver may have to synthesize portions of the message packet such as the 'MESSAGE ID', which should be unique for each message packet.

In block 33 the message packets are broadcast to all transceivers capable of receiving the data transmission. The transceiver listens for acknowledgement signals in block 41. It then compares the amount of acknowledgement signals which it has received with the number in the 'ROBUSTNESS' field of the message packet. If the transceiver has received enough acknowledgements, then the message is erased except for the message ID field of the message packet in block 53. This message ID field is used in determining if a message has been received before.

If the number of acknowledgements received by the transceiver is less than that required, processing continues at block 57. In block 57, the 'TIME STAMP' of the message packet is added to the 'LIFETIME' also in the message packet and is compared to the current time. If the current time is later than the 'TIME STAMP' plus the 'LIFETIME', then the message packet has expired. If it has expired, then the message packet is erased in block 49. If it has not expired, then the message packet is re-broadcast in block 33 and the remaining steps are performed as stated above.

In FIG. 3*b* illustrates the steps of a transceiver receiving and re-transmitting a message packet according to the present invention. In block 35 the message packet is received at a transceiver. All transceivers which receive the message then determine if there were any errors in the transmission. This is done by checking the error correction field ("EC") of the message packet. This may be a cyclical redundancy check (CRC) or any other type of appropriate error detection technique. If the message is deemed to have been received without errors as determined in block 37, an acknowledgement signal is sent from the transceiver which has received the message packet in block 39. If there has been an error detected, then the message packet is erased in block 99.

Transceivers which have received the message packet then determine if the message packet is valid, meaning that the message packet has been received with no errors, the message packet has not been received before as indicated by the stored message IDs, and the message has not expired, as shown in blocks 37, 45 and 47, respectively. If any of these are true, then the message is not valid. Conversely, if all of these are false, the message packet is valid. In block 51, the transceiver receiving the message packet compares the transceiver ID of the message packet with its own internal ID. If the IDs match, then the message has been successfully transmitted to its intended destination in block 55. Processing then continues at block 35 in which the transceiver is a ready status waiting for new messages.

If the ID does not match that of the transceiver, then, in block 83 the message packets are broadcast to all transceivers capable of receiving the data transmission. The transceiver listens for acknowledgement signals in block 91. It then compares the amount of acknowledgement signals which it has received with the number in the 'ROBUSTNESS' field of the message packet. If the transceiver has received enough acknowledgements, then the message is erased except for the message ID field of the message packet in block 103. This message ID field is used in determining if a message has been received before.

If the number of acknowledgements received by the transceiver is less than that required, processing continues at block 107. In block 107, the 'TIME STAMP' of the message packet is added to the 'LIFETIME' also in the message packet and is compared to the current time. If the current time is later than the 'TIME STAMP' plus 'LIFETIME', then the message packet has expired. If it has expired, then the message packet is erased in block 99. If it has not expired, then the message packet is re-broadcast in block 83 and the remaining steps are performed as stated above.

The process continues the remainder of the flow chart of FIG. 3b until the message packet has been successfully transmitted to the intended transceiver, or transceivers have tried transmitting the message packet the number of times defined in the 'ROBUSTNESS' field of the message packet, or the message packet expires.

Figure 3C:
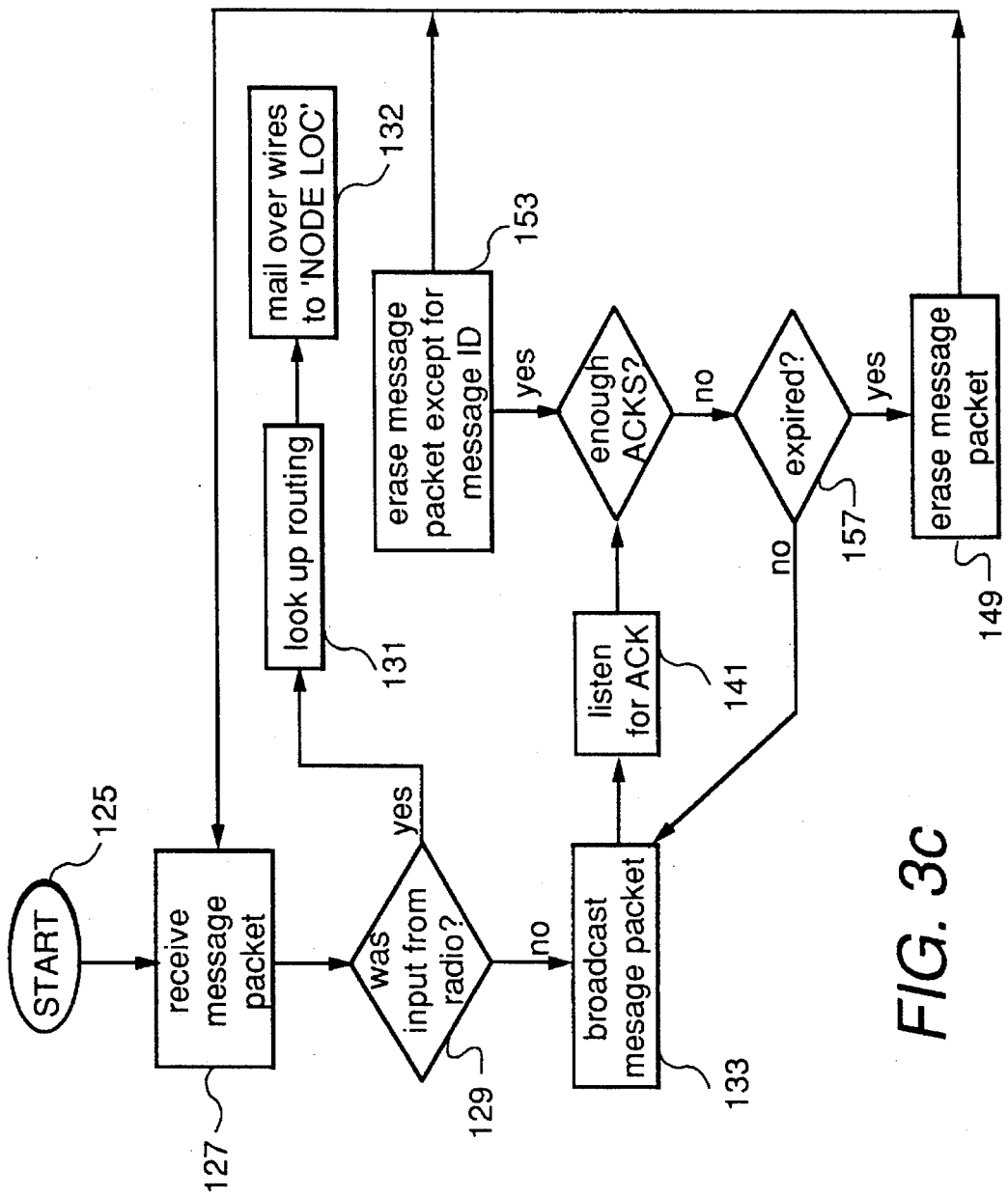
FIG. 3c is a simplified flow chart illustrating a method of bridge units receiving and re-transmitting a message packet according to the present invention.

The communication logic for a bridge transceiver is illustrated in FIG. 3c. The process starts in block 125. In block 127, the bridge transceiver receives a message packet. In block 129, it is determined if the message packet was received from the wired network or radio broadcast. If it has been received from a radio broadcast, then the 'NODE LOC' field of the message packet is used to look up the proper routing to a node identified by 'NODE LOC'. In block 132, the message packet is forwarded over the wired network to the wired node identified by 'NODE LOC'. Processing then continues back in block 127 where the bridge transceiver awaits the next message packet.

In block 129, if the input was not from a radio broadcast, meaning that the input was from the wired network, the message packet is broadcast in block 133. In block 141, the bridge transceiver listens for acknowledgements, and if enough acknowledgements have been received, the message is erased in block 153 except for the message ID which is retained for further use. If there has not been enough acknowledgements in block 157 and it is determined if the message has expired, and if it has, in block 149 the message packet is entirely erased. Processing then continues in block 127 awaiting the next message packet.

If the message has not expired and if not enough acknowledgements have been received, then processing continues back at block 133.

Since the system is distributed, an error in one of the communicating units may not make a difference, in fact many errors in many communicating units may also have no effect. In centralized systems, however, an error by the master controller causes errors in transmission with little or no redundancy. The present invention therefore exhibits a highly fault tolerant system for message transmission.

A problem may occur in which a transceiver may receive two message packets at the same time, known as a 'collision'. In FIG. 1b, transceiver 21 is shown receiving a message packet from both transceivers 13 and 19. If this occurs at the same time, there would be a collision sensed by transceiver 21. A collision is typically determined at a receiver. As transceiver 21 determines the collision has occurred, it may broadcast a signal to all transceivers in its local transmission area, that a collision had occurred. Transceivers 13 and 19 may receive this indication that a collision has occurred and re-transmit the message packet in one of the methods defined above.

Logic can be built into the transceivers such that when a collision is detected, the last message packet sent would be re-transmitted, but at a time period which is staggered from that in which the first message packet was sent. This may be done in a number of ways. When a collision is detected, the data may be sent during its predetermined time spot but offset within the time slot so as not to be sent at the same initiation time as previous message packet was sent.

Another possible method would be that of sending a message packet based upon a delay time after it was received. If a data collision has occurred, the delay time is either extended or shortened, the delay time is either randomly extended or shortened according to known procedures.

In order to produce a realistic system implementing the present invention, motivation is required for each of the transceivers to receive and pass on a message packet. One such method of providing this motivation is to charge each transceiver initiating or receiving a message packet a message fee. Intermediate transceivers which receive and re-transmit the message packet are 'paid', i.e., the message fee is reduced, by a fraction of the number of message packets that the transceiver relays. The amount they are 'paid' may be a function of the number of transceivers to transmit to defined in the 'ROBUSTNESS' field, the length of the message. Similarly, the 'charge' for sending a message may be a function of message length, the 'ROBUSTNESS' value, and the 'LIFETIME' value. Therefore, each communicating unit has incentive to become a repeater station.

A tamper-proof credit accumulator register is installed which will keep track of the earned credit values. A log is also kept which records key parameters respecting the relayed packets such as the originator's ID, the persistence, the lifetime and the packet length. This log is electronically "dumped" every time the mobile unit passes within range of a log collection point. These electronic facilities are also distributed about the city and it is expected that most vehicles will be within range of one or more of the facilities many times each day. Should the vehicles memory become nearly full, it will be possible to empty the log into a log collection point by other gateways such as conventional or cellular telephone or other means. An accounting is performed periodically and based on the total of the credit values earned by the mobile repeater. A wired node also maintains a similar log. This log is dumped periodically to the log collection point by wired network.

The debiting of the packet originators for communication service performed is done by analysis of the collected logs of the mobile and fixed repeaters. The bill to the originator is based on the number of successfully delivered packets.

Analysis of the logs will also allow the network to be monitored towards the goal of increasing its efficiency and overall values as well as identifying those components that are in need of maintenance.

In another embodiment, 'storefronts' may be set up in which message packets may be initiated, received, or passed on. These storefronts charge an operator a charge to receive a message addressed to them, or to initiate a message to be sent to a desired transceiver.

In one embodiment the mobile transceivers are carded by those whose duties mostly keep them on the roadways in the city such as taxi cabs, public conveyance vehicles, delivery services etc. This provides an ever changing and multi-opportunity situation in which to access potential transceivers.

In another embodiment, the transceivers may be a hand-held unit similar to a pager. Messages to be transmitted may be typed in, downloaded from a computer, or digitized voice messages. There also may be capability of sending and receiving faxes, and image data.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What I claim is:

1. A method of transmitting information over a hybrid network having a plurality of transceivers, bridge transceivers and a wired network with wired nodes, each with a unique internal ID number, comprising the steps of:
   a) obtaining message information desired to be transmitted;
   b) determining a destination identification number (ID) for a destination unit intended to receive information packet;
   c) looking up a NODE LOC code from a predetermined list of wired nodes identifying a wired node closest to the intended destination unit:
   d) creating a message packet having a message ID, the destination ID, the NODE LOC and the message information;
   e) providing the message packet to a bridge transceiver connected to the wired network;
   f) the bridge transceiver looking up the NODE LOC and routing the message packet to the node identified by NODE LOC through the wired network;
   g) the node at NODE LOC checking the destination ID with its own ID and if the IDs match, the message packet has been successfully transmitted to its intended destination unit, if the IDs do not match, broadcasting the message packet by radio signal to recipient transceivers:
   h) for each recipient transceiver receiving the broadcast:
      1. checking for errors in the received message packet, and sending an acknowledgment signal if received with no errors,
      2. identifying if the message is a valid message packet, a valid message packet being one which was received without errors, has not expired and has a message ID which does not match stored message IDs,
      3. comparing the destination ID to the internal ID of the recipient transceiver,
      4. storing and utilizing valid message packets for which the destination ID matches the internal ID of the recipient transceiver, and
      5. re-broadcasting the valid message packets to other recipient transceivers if the destination ID does not match the internal ID of the recipient transceiver.

2. The method of transmitting information of claim 1 further comprising, after the step of re-broadcasting the valid message packets, the steps of:

a) listening for an acknowledgment (ACK) signal from a recipient transceiver which has received the message packet without error;
   b) comparing a count of ACK signals received to a ROBUSTNESS value in the message packet;
   c) deleting the message except for the message ID if the count of ACK signals meets or exceeds the ROBUSTNESS value, and
   d) determining if the message has expired and erasing the message if it has expired.

3. The method of transmitting information of claim 1 further comprising, after the step of re-broadcasting the valid message packet, the steps of:
   a) detecting if a collision has occurred; and
   b) re-broadcasting valid message packet after a randomized delay period to reduce the possibility of another collision.

4. The method of transmitting information of claim 1 wherein the step of providing the message packet to a bridge transceiver comprises the steps of:
   a) broadcasting the message packet by radio signal from a transceiver to recipient transceivers;
   c) for each recipient transceiver receiving the broadcast:
      1. checking for errors in the received message packet, and sending an acknowledgment signal if received with no errors,
      2. identifying if the message is a valid message packet, a valid message packet being one which was received without errors, has not expired and has a message ID which does not match stored message IDs,
      3. comparing the destination ID to an internal ID of the recipient transceiver,
      4. storing and utilizing valid message packets for which the destination ID matches the internal ID of the recipient transceiver, and
      5. re-broadcasting the valid message packets to other recipient transceivers until the bridge transceiver whose internal ID matches the destination ID receives the message packet.

* * * * *